United States Patent [19]

Ito

[11] Patent Number: 4,476,951
[45] Date of Patent: Oct. 16, 1984

[54] ENGINE FOR MOTORCYCLES

[75] Inventor: Toshifumi Ito, Tokorozawa, Japan

[73] Assignee: Honda Motor Co., Ltd., Tokyo, Japan

[21] Appl. No.: 434,002

[22] Filed: Oct. 13, 1982

[30] Foreign Application Priority Data

Oct. 13, 1981 [JP] Japan .............................. 56-162998
Oct. 13, 1981 [JP] Japan .......................... 56-151691[U]
Oct. 29, 1981 [JP] Japan .............................. 56-173476

[51] Int. Cl.³ ......................... B62M 7/02; F02N 11/00
[52] U.S. Cl. .............................. 180/219; 123/179 E; 123/195 A
[58] Field of Search ............... 180/219, 228, 229, 230; 123/179 R, 179 D, 179 N, 179 E, 195 A, 195 E

[56] References Cited

U.S. PATENT DOCUMENTS 2,930,259  3/1960  Riedel ............................ 123/179 D

FOREIGN PATENT DOCUMENTS 222265  5/1924  United Kingdom ................ 180/219

Primary Examiner—John A. Pekar
Attorney, Agent, or Firm—Arthur L. Lessler

[57] ABSTRACT

At least part of upper surfaces of the transmission case and the crankcase is formed as a generally flat surface, on which the generator and the starting motor are arranged in end-to-end facing relation, with their drive shafts disposed parallel with the crankshaft, to thereby reduce the axial size of the engine. The generator is arranged close to the cylinders of the engine, and has a casing in which a forced-air cooling fan is mounted, and which has its peripheral wall provided with port means located at an upper portion and having a downwardly directed opening, and also provided with a through hole at a lower portion. The port means and the through hole are each adapted to effect suction or discharge of cooling air into or out of the casing.

14 Claims, 17 Drawing Figures

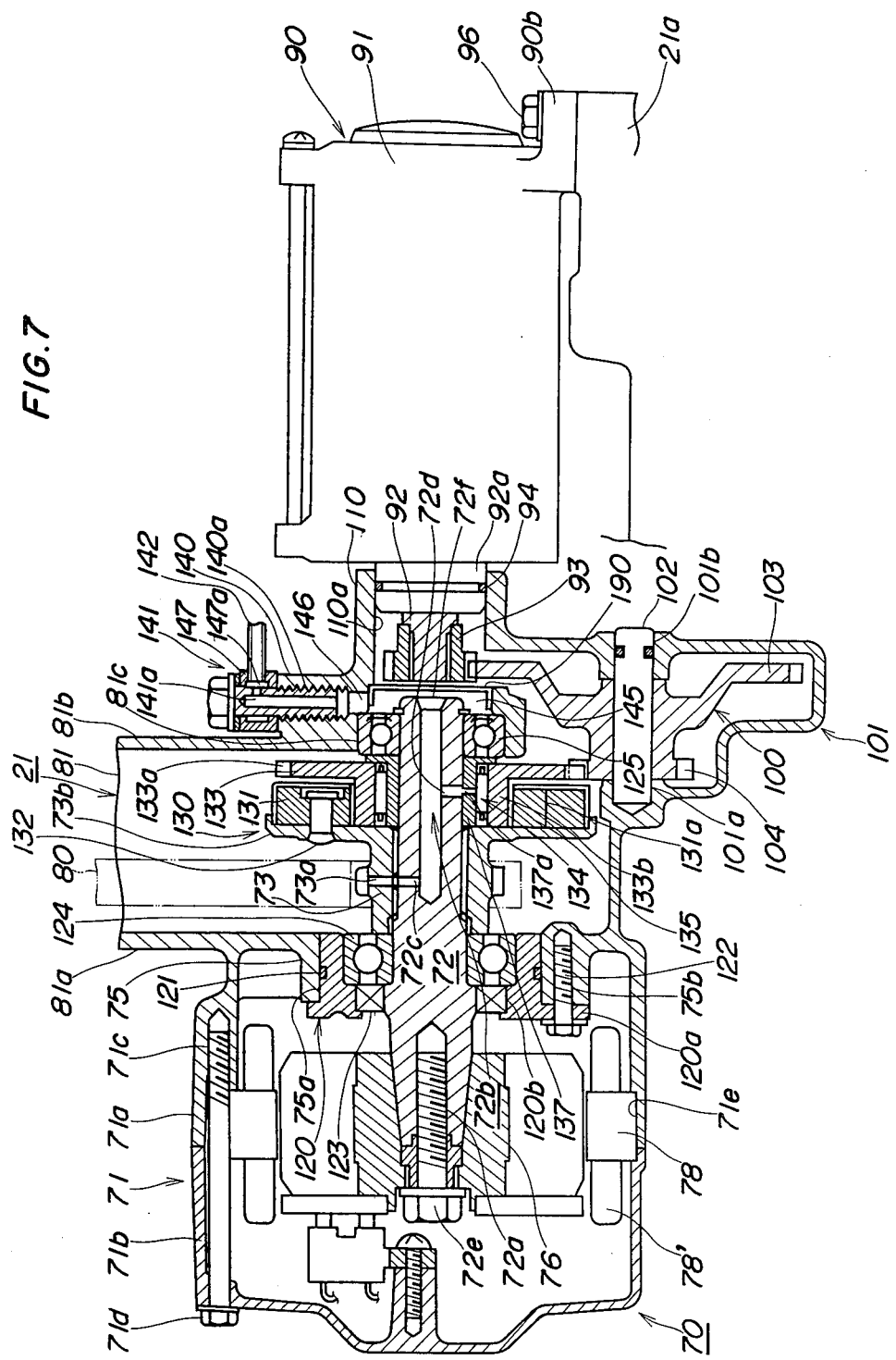

ENGINE FOR MOTORCYCLES

BACKGROUND OF THE INVENTION

This invention relates to engines for motorcycles, and more particularly to improved arrangements of the generator and the starting motor located at a side of the engine cylinders.

In a motorcycle in general, an engine and accessories such as a generator, and other electrical parts are mounted in a space defined inside the main frame. A compact main frame is particularly advantageous for designing a motorcycle compact in size. To this end, the accessories should desirably be arranged in a compact manner.

On the other hand, in conventional motorcycles, the generator is usually disposed parallel with the crankshaft which extends transversely of the motorcycle body, so as to make the total width of the engine small as compared with an arrangement in which the generator is disposed at an end of the crankshaft in axial alignment. In such conventional arrangement, the crankshaft, a mainshaft adapted to be driven by the crankshaft via a clutch, and a countershaft having gears meshing with multispeed transmission gears mounted on the mainshaft are arranged on a substantially horizontal common plane. As a consequence, the clutch casing, which accommodates a primary reduction driven gear and a clutch, both having large sizes, clutch has its upper surface projected considerably far above the upper surfaces of the mainshaft casing and the countershaft casing accommodating the mainshaft and the countershaft, respectively, leaving rather a small space between the upper surface of the clutch casing and the carburetor of the engine arranged above these casings.

Owing to this spatial limitation, in the type where the generator is arranged on the upper surfaces of the mainshaft casing and the countershaft casing, usually a starting motor is arranged rearwardly of the generator. However, according to this arrangement, if a compact main frame has a portion thereof disposed close to a rear side of the engine, it is hard or impossible to mount an engine fitting hanger at the rear side of the engine when mounting the engine onto the main frame, since the starting motor is rearwardly projected toward the main frame. Also, as for the engine per se, it is desirable to reduce the axial size or length of same as well as the transverse size or width, for compacting the main frame.

Further, according to the above-mentioned conventional arrangement of the generator and the starting motor, the generator casing, the starting motor casing and mounting frames therefor are inevitably fabricated separately, requiring a large number of man-hours for fabrication and assemblage due to many component parts, which results in degraded productivity as well as increased weight of the engine.

Still further, if the generator is arranged close to the engine cylinders or to the starting motor, particularly for compacting the main frame, its temperature can be elevated due to heat radiated by the engine cylinders or the starting motor, or due to its own heat. This requires use of component parts having high heat resistance in the generator. Therefore, the generator should desirably be provided with a cooling means.

SUMMARY OF THE INVENTION

It is an object of the invention to provide an engine for motorcycles, in which the generator and the starting motor are arranged in a manner permitting compacting in size the main frame and the engine.

It is a further object of the invention to provide an engine for motorcycles, in which casings for accommodating the generator, the starting motor and power transmitting means, as well as frames for mounting these equipments and parts in the casings are integrally formed in one body, to reduce the number of component parts and enhance the productivity.

It is another object of the invention to provide an engine for motorcycles, which is provided with a forced-air cooling means for the generator, which has a water-proof construction, to permit arranging the generator at a location close to the cylinders of the engine.

According to the invention, the mainshaft is located at a level lower than the crankshaft and the countershaft. The generator is arranged on the surfaces of the crankcase and the transmission case with its drive shaft disposed parallel with the crankshaft. The starting motor is also arranged on the same surfaces with the generator, with its output shaft disposed parallel with the crankshaft. The output shaft of the starting motor has its one end disposed opposite one end of the drive shaft of the generator. The drive shaft of the generator and the output shaft of the starting motor extend from their opposite disposed ends in opposite directions away from each other. The generator and the starting motor are drivingly coupled to each other by first power transmitting means, and the generator and the crankshaft by second power transmitting means, respectively.

The generator and the starting motor are arranged on the same axis or different axes with respect to each other. The first power transmitting means preferably comprises an idle gear engaging with a gear secured on the drive shaft of the generator, and a one-way clutch interposed between the idle gear and the output shaft of the starting motor and engaging therewith. The second power transmitting means preferably comprises first and second sprockets secured on the generator and the starting motor, respectively, and a chain engaging with the first and second sprockets. The generator casing and a starting motor-fitting frame are preferably integrally formed in one body with at least part of the crankcase and the transmission case.

Further, the generator includes a forced-air cooling fan accommodated in its casing, and port means provided at a peripheral wall of the generator casing, for suction or discharge of air into or out of the generator casing. The port means has a through hole formed in the peripheral wall of the generator casing, a hollow tubular member arranged on the peripheral wall of the generator casing in alignment with the through hole and projected upwardly of the generator casing, and having an upper open end and a peripheral wall, and a cap disposed over the upper open end of the hollow tubular member and at least part of the peripheral wall of same. The hollow tubular member and the cap define therebetween an air passageway which has a downwardly directed annular open end and communicates the atmosphere with the upper open end of the hollow tubular member.

Further, a waterproofing cover is disposed over at least part of the transmission case. The generator casing has at least one through hole formed in its peripheral wall at a lower portion, for suction or discharge into or out of the generator casing in cooperation with the forced-air cooling fan. The waterproofing cover is downwardly pendent from the lower portion of the peripheral wall of the generator casing and extends along the transmission case in a manner defining a second air passageway between the waterproofing cover and the transmission case, which communicates the last-mentioned through hole with the atmosphere.

The above and other objects, features and advantages of the invention will be more apparent from the ensuing detailed description taken in connection with the accompanying drawings.

BRIEF DESCRIPTION OF THE DRAWINGS

FIG. 7 is a top plan view, partly in section, of the generator and the starting motor for motorcycle engines, according to another embodiment of the present invention;

DETAILED DESCRIPTION

Figure 1:
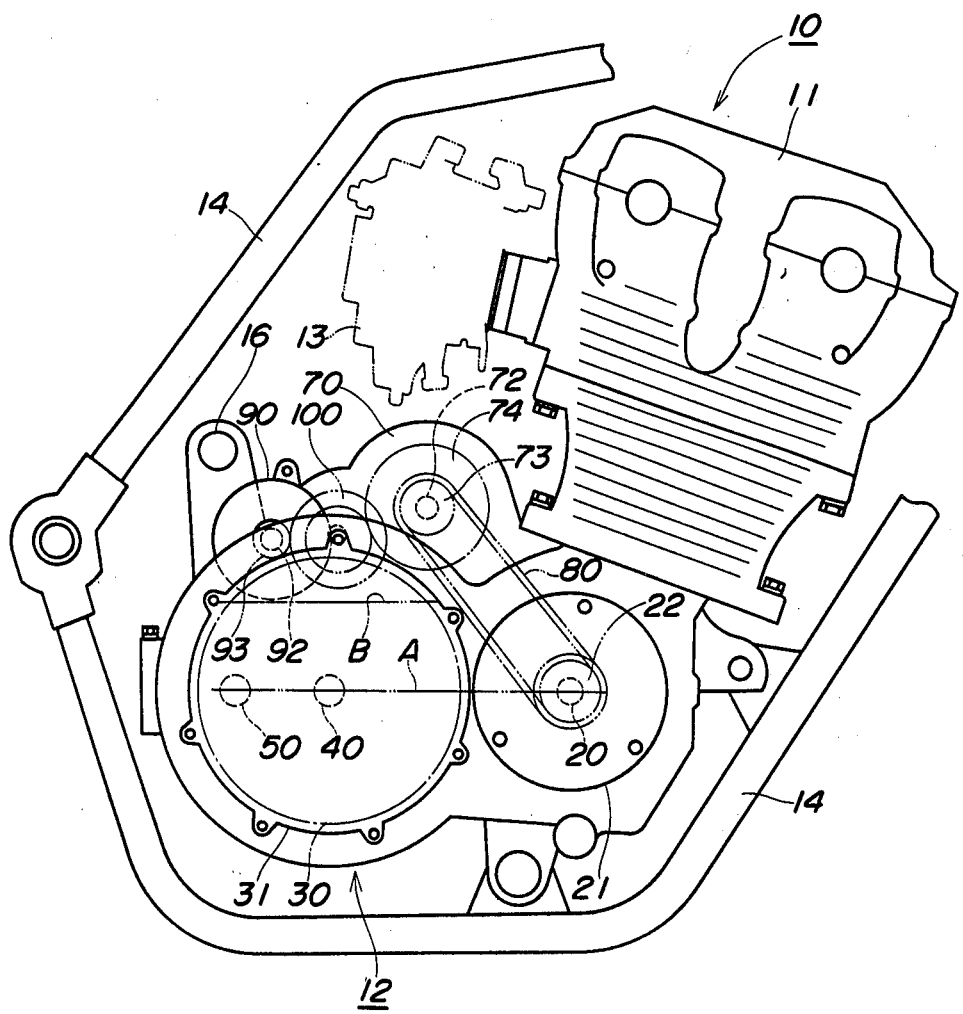
FIG. 1 is a schematic side view illustrating a conventional engine for motorcycles.
Figure 2:
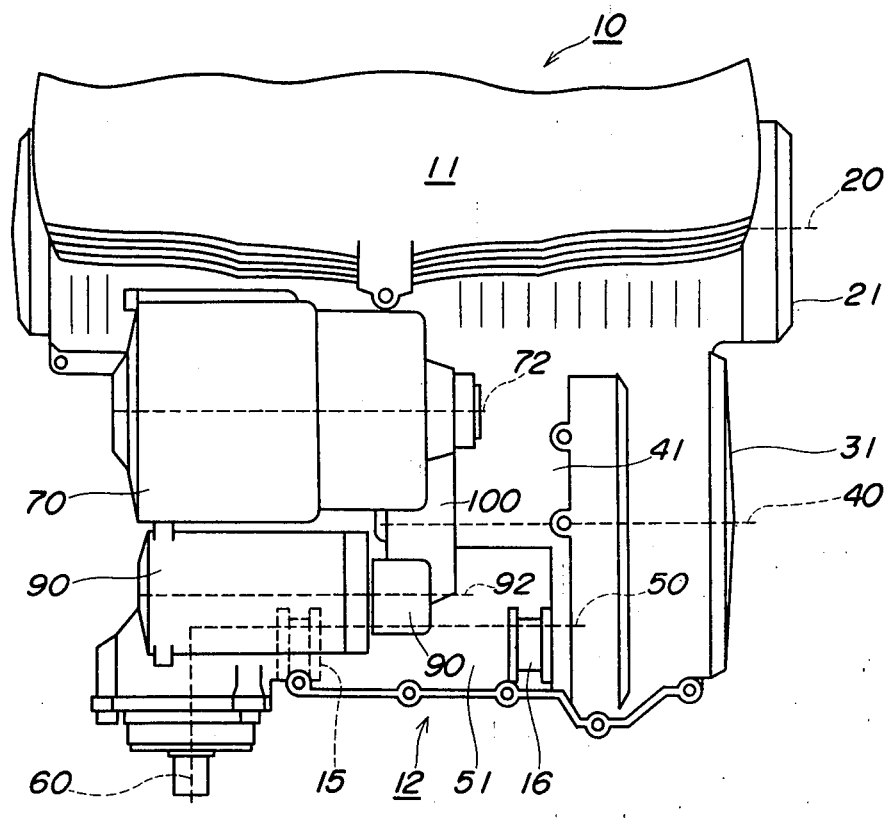
FIG. 2, is a schematic top plan view of the engine of FIG. 1.

Referring first to FIGS. 1 and 2, a conventional engine for motorcycles is illustrated. The engine 10 includes a crankshaft 20 extending transversely of the engine, a mainshaft 40 extending parallel with the crankshaft 20 and drivingly coupled thereto through a clutch 30, and a countershaft 50 extending parallel with the mainshaft 40 and having gears, not shown, engaging with multispeed gears mounted on the mainshaft 40. These shafts 20, 40 and 50 are located on a substantially horizontal common plane A.

The engine 10 is equipped with a generator 70 which is arranged at a rear side of the engine at a location closer one lateral side of same and mounted on upper surfaces of a mainshaft casing 41 and a countershaft casing 51 accommodating the mainshaft 40 and the countershaft 50, respectively, as shown in FIG. 2. On the other hand, a starting motor 90 for actuating the engine 10 is arranged on the upper surface of the countershaft casing 51 at a location rearward of the generator 70 so as to avoid its interference with a carburetor 13 arranged above the starting motor 90. This interference will occur when the starting motor 90 is arranged on the upper surface of the clutch casing 31 in axially opposite or end-to-end facing relation to the generator 70, because the clutch casing 31, which accommodates a primary reduction driven gear having a large size, not shown, as well as the clutch 30, has its upper surface upwardly projected above a plane B on which the upper surfaces of the aforementioned casings 41 and 51 are located.

According to the arrangement of the generator 70 and the starting motor 90 illustrated in FIGS. 1 and 2, if a compact main frame such as one shown as 14 were used, it would be located too close to a rear portion of the engine cylinders, for an engine fitting hanger 15, illustrated by the break line in FIG. 2, to be mounted at a location rearward of the engine cylinders 11, because the starting motor 90 is projected rearwardly of the engine cylinders 11.

The engine for motorcycles according to the present invention will now be described in detail with reference to FIGS. 3 through 17, wherein elements or parts corresponding to those shown in FIGS. 1 and 2 are designated by identical reference numerals.

Figure 3:
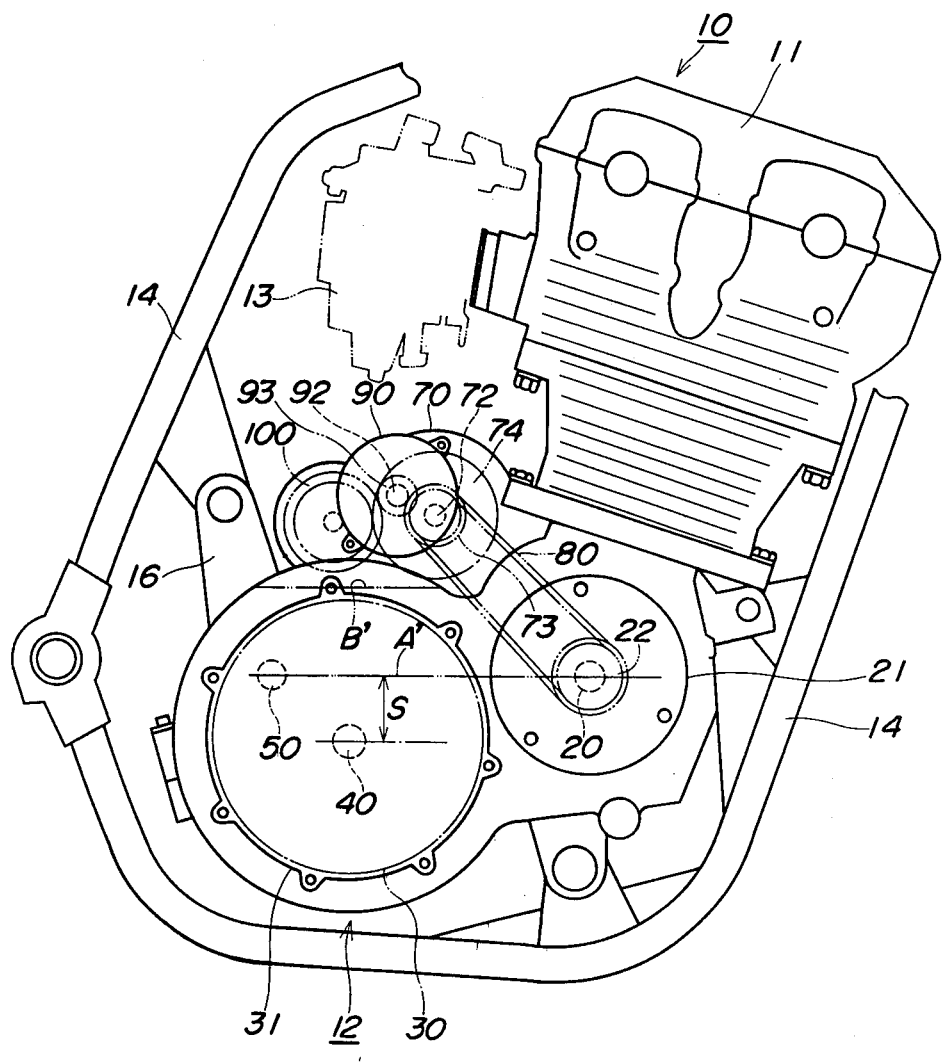
FIG. 3 is a schematic side view illustrating an engine for motorcycles, according to an embodiment of the present invention.
Figure 4:
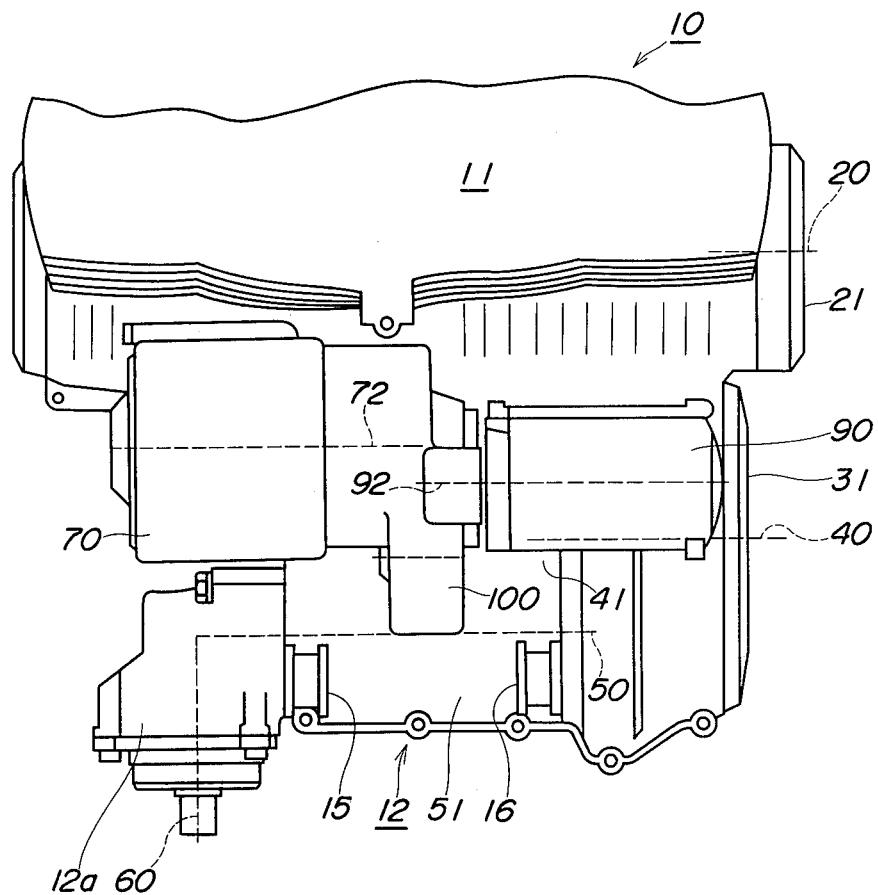
FIG. 4 is a schematic top plan view illustrating the engine of FIG. 3.

Referring first to FIGS. 3 through 6, there is illustrated a first embodiment of the invention. In FIGS. 3 and 4, a crankshaft 20 extends transversely of a motorcycle on which the engine 10 is installed, as in the conventional arrangement. A countershaft 50 extends parallel with the crankshaft 20, and the two shafts are arranged on a substantially horizontal common plane A' so that a crankcase 21 and a countershaft casing 51 accommodating the crankshaft 20 and the countershaft 50, respectively, have their uppermost portions located on an upper horizontal plane B'.

On the other hand, a mainshaft 40 is arranged at a location lower than the above horizontal plane A' by a predetermined distance S, so that a clutch casing 31, which is arranged concentrically with the mainshaft 40 and accommodates a large size primary reduction driven gear, not shown, and a clutch 30, has its uppermost portion located on the above horizontal plane B'. As a consequence, the uppermost portions of the casing 21, 31, 41 and 51 present a common continuous flat surface or plane B'. That is, an upper portion of the clutch casing 31 does not project above the upper surfaces of the other casings, as distinct from the engine shown in FIGS. 1 and 2. This arrangement provides a larger space between the upper surface or plane B' of the clutch casing 31 and the carburetor 13 at a rear side of the engine cylinders 11, than the conventional engine in FIGS. 1 and 2.

A generator 70 is arranged on the upper surfaces or plane B' of the crankcase 21 and the mainshaft casing 41, at a rear side of the engine cylinders 11 at a location closer to one or left lateral side of same, with its drive shaft 72 disposed parallel with the crankshaft 20. A starting motor 90 is arranged on the upper surfaces or plane B' of the clutch case 31 and the mainshaft casing 41 at the rear side of the engine cylinders 11 at a location closer to the other or right lateral side. The starting motor 90 is disposed in axially opposite or end-to-end facing relation to the generator 70 with its inner end opposite an inner end of the latter, and with its drive shaft 92 extending parallel with the crankshaft 20. The shafts 72, 92 extend from their opposite disposed ends in opposite directions away from each other. A pair of fitting hangers 15 and 16 for mounting the engine 11 onto the main frame 14 are secured on a transmission case 12 at locations close, respectively, to the generator 70 and the starting motor 90. The transmission case structure 12 is formed by the clutch casing 31, the mainshaft casing 41, and the countershaft casing 51.

The countershaft 50 carries a sprocket secured thereon and meshing with a chain, not shown, drivingly engaging with the rear wheel, or a bevel gear, not shown, secured thereon and meshing with a pinion gear, not shown, of a propeller shaft 60, so that rotation of the crankshaft 20 is transmitted to the rear wheel through the countershaft 50.

Figure 5:
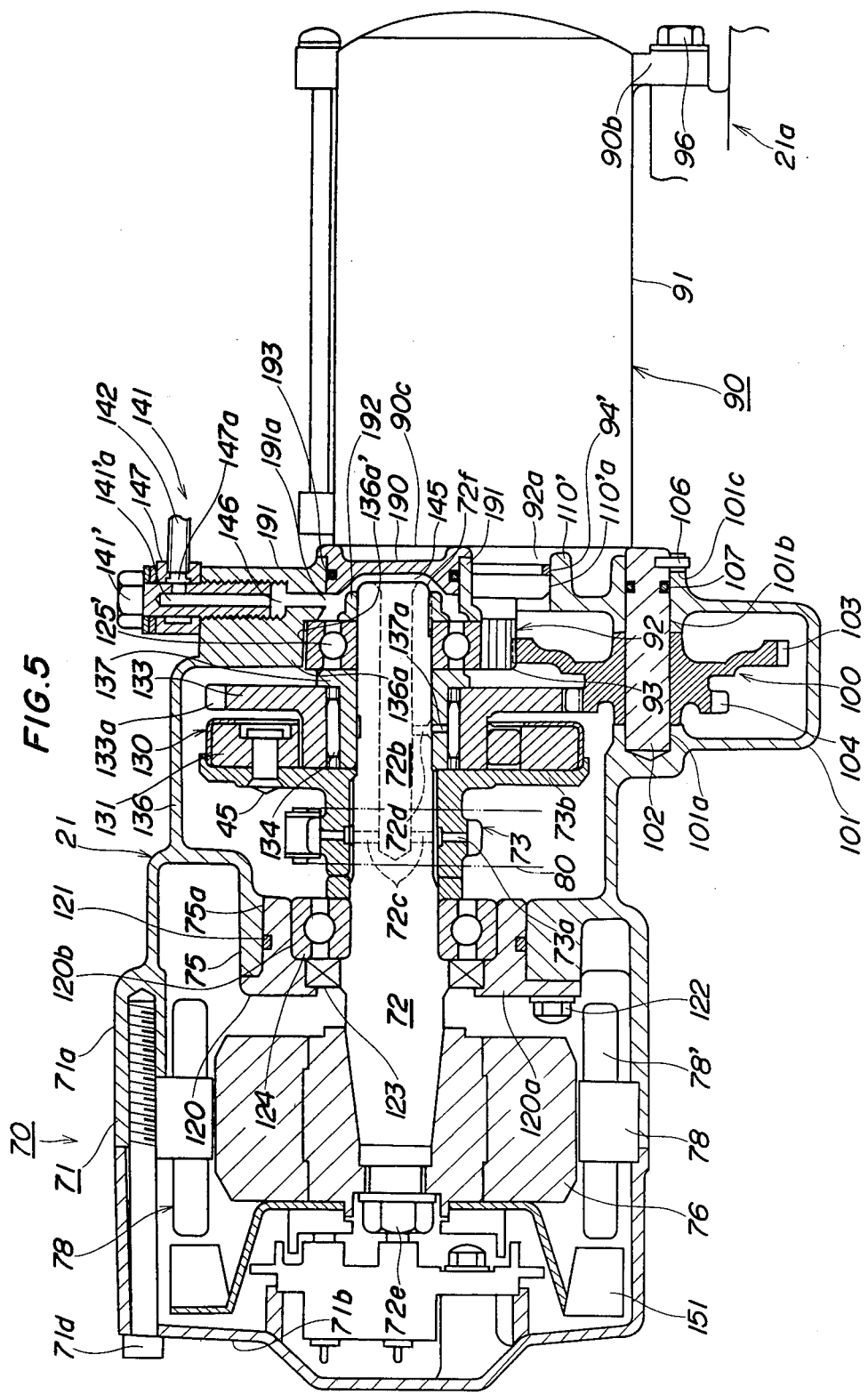
FIG. 5 is a top plan view, partly in section, of details of the generator and the starting motor forming part of the engine of FIG. 3.

FIG. 5 illustrates an arrangement of the generator 70 and the starting motor 90 of the engine shown in FIGS. 3 and 4. In FIG. 5, the crankcase 21 is formed integrally with a casing 136 accommodating a chain 80 and a one-way clutch 130, a casing 71 accommodating the generator 70, a casing 101 accommodating an idle gear 100, a frame 191 having a fitting hole 191a in which a cover 190 is fitted, a frame 110' having a motor fitting hole 110'a, and the frame 75 having a generator supporting hole 75a. The holes 191a and 75a are disposed in concentric and opposite relation to each other. The holes 110'a and 191a are disposed on different axes or concentrically and parallel with respect to each other. Also, they are arranged close to each other, and both communicate with the interior of the casing 101.

The casing 71 and the frame 75 are each formed with a plurality of axial tapped holes 71c, 75b circumferentially spaced from each other at predetermined intervals.

A generally cylindrical bearing frame 120 is fitted in the through hole 75a of the frame 75, with a sealing member 121 interposed therebetween. This bearing frame 120 has a radially outwardly extending flange 120a at its one open end, and secured to the frame 75 by means of bolts 122 screwed in the tapped holes 75b.

The drive shaft 72 of the generator 70 has its one half portion journalled in a central through hole 120b formed in the bearing frame 120 through a sealing member 123 and a bearing 124, and its other half portion journalled by a bearing 125 fitted in an opening 136a' formed in a wall 136a of the casing 136 facing toward the starting motor 90. The drive shaft 72 has its opposite end portions formed, respectively, with a tapped hole 72a and a hole 72b extending along the axis of the shaft and opening in their respective end faces. The oil returning hole 72b communicates with the outside through radial holes 72c and 72d formed in the same shaft 72 at a substantially central portion and at a location closer to the right end, respectively. A collar 137 is fitted on the shaft 72 and has a boss formed with a hole 137a opposite the above radial hole 72d.

A sprocket 73 is spline-fitted on the drive shaft 72 at its substantially central portion for rotation in unison with the latter, which is formed, at a predetermined tooth land, with a radial hole 73a opposite the hole 72c in the drive shaft 72. The sprocket 73 is formed integrally with a support plate 73b, in the form of an annular disc, radially outwardly extending from an end facing toward the side wall 81b of the chain casing 81. The sprocket 73 engages with a sprocket, not shown, secured on the crankshaft, by means of the chain 80 indicated by the two-dot chain line in FIG. 5.

A one-way clutch 130 is fitted on the shaft 72 and disposed adjacent the sprocket 73, at a side toward the wall 136a. The clutch 130 comprises a driven member 131 secured to the support plate 73b by means of pins 132, for rotation in unison with the sprocket 73, and a driving member 133 journalled on the shaft 72 through a bearing 134. The driving member 133 has a radially extending flange having a toothed outer peripheral edge 133a.

Figure 6:
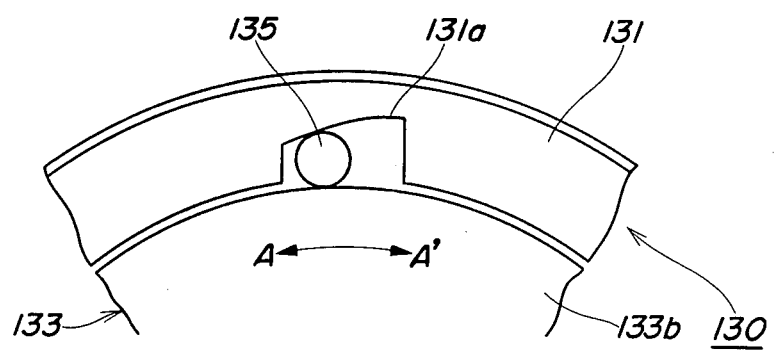
FIG. 6 is a schematic fragmentary view of essential part of a one-way clutch provided in the engine of FIG. 5, as viewed from the starting motor side.

As shown in FIG. 6, the driven member 131 has its inner peripheral surface formed with a groove 131a having a substantially trapezoidal cross section, in which a roller 135 is loosely fitted. The driving member 133 has its axial boss 133b disposed opposite the above groove 131a for engagement and disengagement of the clutch 130 in cooperation with the groove 131a and the roller 135. When the driving member 133 rotates relative to the driven member 131 in the counterclockwise direction as indicated by the arrow A in FIG. 6, the roller 135 is brought into a position shown in FIG. 6 and then kept in pressure contact with the members 131 and 133 at the same position, to hold the driven member 131 stationary relative to the driving member 133 to cause the former to rotate in unison with the latter. On the other hand, when the driving member 133 rotates relative to the driven member 131 in the clockwise direction as indicated by the arrow A' in FIG. 6, the roller 135 runs idle to disengage the driven member 131 from the driving member 133 so that the driven member is at rest.

Mounted on an end portion of the drive shaft 72 remote from the starting motor 90 is a rotor 76 of the generator 70, which is rigidly secured to the shaft 72 by a stud bolt 72e screwed into the tapped hole 72a. A stator core 78 carrying a stator coil 78' thereon is fitted in a main body 71a of the casing 71 along its inner peripheral surface in the vicinity of its left open end. The stator core 78 is rigidly fitted in a recess 71e formed in the inner peripheral walls of the main body 71a and the casing cap 71b of the casing 71 at their junction. A casing cap 71b is mounted on the main body 71a with its one end abutting against and joined to the left open end of the main body 71a by means of fastening bolts 71d screwed into the tapped holes 71c.

The output shaft 92 of the starting motor 90 carries a gear 93 spline-fitted on its tip, and disposed in meshing engagement with the idle gear 100 accommodated within the idle gear casing 101. The idle gear 100 is rotatably supported on a shaft 102 fitted in a shaft bore 101a and in a shaft bore 101b via an O-ring 107, both bores being formed in the casing 101, and rigidly secured to the casing 101 by means of a pin 106 which is fitted through a through hole 101c formed in the casing 101 and projected into the shaft 102 in the hole 101b. The idle gear 100 is formed integrally with two gears 103 and 104, the former engaging with the gear 93, and the latter with the gear 133a of the driving member 133 of the one-way clutch 130. Thus, the output shaft 92 of the starting motor 90 and the driving member 133 of the one-way clutch 130 engage with each other through the idle gear 100.

A nut 192 is threadedly fitted on an end of the drive shaft 72 facing toward the starting motor 90, to prevent axial dislocation of the sprocket 73, the one-way clutch 130, the collar 137 interposed between the shaft 72 and the driving member 133 of the clutch 130, and the bearing 125. Fitted in an open end of the hole 191a of the frame 191 is the above-mentioned cover 190, with a sealing member 193 interposed between the hole 191a and the cover 190.

The boss 92a of the output shaft 92 of the starting motor 90 is fitted in the hole 110'a of the frame 110' via a sealing member 94'. The motor 90 has its end face 90c on the output shaft side disposed in contact with end faces of the cover 190 and the shaft 102 to prevent these members 190 and 102 from being disengaged from their respective holes 191a and 101b formed, respectively, in the frame 191 and the casing 101. In this manner, the generator 70 and the starting motor 90 are disposed in axially opposite relation to each other, with their shafts 72 and 92 disposed parallel with each other and engaging each other through the idle gear 100 and the one-way clitch 130. Further, the combined axial size of the generator 70 and the starting motor 90 is reduced to a value as small as possible, since the output shaft 92 of the motor 90 is inserted into the fitting hole 110'a.

A radially extending tapped hole 191b is provided between the clutch casing 136 and the cover fitting frame 191, in which is threadedly fitted a coupling bolt or fluid coupling 141 having an radial oil passage 141a formed therein in a manner securing a collar 147 having an axial oil passage 147a formed therein, to the frame 191. The coupling bolt 141 is connected to an oil pump, not shown, through a pipe 142. The above oil passage 141a communicates via a hole 146 with an oil-tight chamber 145 defined between the end face 72f of the drive shaft 72 of the generator 70 facing the starting motor 90 and the cover 190 fitted in the cover fitting frame 191. In FIG. 5, reference numeral 151 designates an air cooling fan secured to the shaft 72 of the generator 70 together with the rotor 76.

Although in the illustrated arrangement of FIG. 5 the lubricating oil passageway is provided inside the cover 190, which communicates with the oil pump, grease or a like filler may be filled in the space inside the cover 190 instead of providing such oil passageway. In such case, slight gaps may be provided between the end face 90c of the starting motor 90 and the end faces of the cover 190 and the idle gear shaft 102, without spoiling the effects obtainable from the FIG. 5 arrangement.

The operation of the above described embodiment of the present invention will now be described. First, at the start of the engine 10 the generator 70 operates as follows. When the starting motor 90 is actuated to start the engine 10, the idle gear 100 having its one gear 103 meshing with the gear 93 on the shaft 92 of the starting motor 90 rotates in unison with the rotating shaft 92, which in turn causes rotation of the driving member 133 of the one-way clutch 130 which has its gear 133a meshing with the other gear 104 of the idle gear 100. The driving member 133 rotates in such a direction that the driven member 131 is rotatively driven in unison with the driving member 133. The rotation of the driven member 131 is transmitted to the drive shaft 72 of the generator 70 through the sprocket 73 rotating in unison with the driven member 131 and the shaft 72. The rotation of the drive shaft 72 is transmitted to the crankshaft 20 through the chain 80 meshing with the sprocket 73 and the sprocket 22, in FIG. 3, meshing with the chain 80, to cause rotation of the crankshaft 20 for actuation of the engine 10.

After the engine 10 has thus been started, the driven member 131 of the one-way clutch 130 is continuously rotated without interruption, by the rotating crankshaft 20 through the chain 80. At the same time, the starting motor 90 is deenergized to stop, so that the driving member 133 of the one-way clutch 130, which is rotatively driven by the starting motor 90 through the idle gear 100, also stops. As a consequence, the one-way clutch 130 runs idle, resulting in interruption of the power transmission from the starting motor 90 to the generator 70.

Then, the drive shaft 72 of the generator 70 is rotatively driven by the crankshaft 20 through the chain 80. The resulting rotation of the rotor 76 secured to the shaft 72 causes the stator coil 78' concentrically arranged around the rotor 76 to generate induced electromotive force, thus carrying out power generation.

The operation of the oil lubrication system of the engine 10 is as follows: Lubricating oil pumped by the oil pump, not shown, of the oil lubricating system is quided through the pipe 142, the oil passage 147a in the collar 147, the oil passage 141a in the coupling bolt 141 and the hole 146, into the oil-tight chamber 145 to lubricate the bearing 125. Then, the oil is further guided through the passage 72b in the drive shaft 72 of the generator 70 and the radial hole 73a in the sprocket 73, into the tooth land of the sprocket 73, and then fed to the chain 80 to lubricate same. On the other hand, the oil delivered into the passage 72b in the drive shaft 72 is guied through the radial hole 72d and the hole 137a in the collar 137 and fed to the bearing 134 to lubricate same. Further, the oil passing through the bearing 134 is also fed to the gear 93 of the output shaft 92 of the starting motor 90, the gears 103 and 104 of the idle gear 100, the gear 133a of the one-way clutch 130, etc. to lubricate them. After being thus supplied to various parts, the lubricating oil is guided through the casing 136, etc. to collect onto the bottom of the crankcase 21. The above described lubrication cycle is repeated by the oil lubrication system to recirculate the lubricating oil in the engine.

Figure 8:
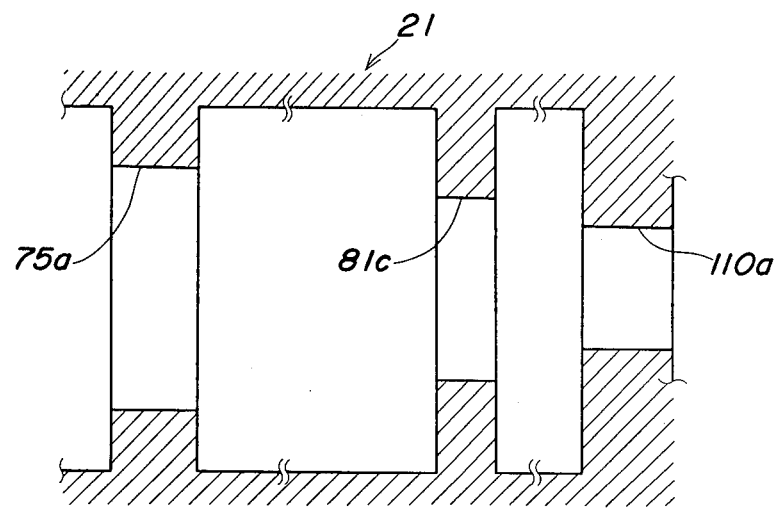
FIG. 8 is a schematic sectional view of holes formed in the generator and a motor-fitting frame appearing in FIG. 7.

FIGS. 7 and 8 illustrate another embodiment of the arrangement of the generator and the starting motor, according to the invention. The arrangement according to this embodiment is distinguished from the first embodiment previously described with reference to FIGS. 3 through 6, mainly in that the drive shaft of the generator and the output shaft of the starting motor are arranged on the same axis.

In FIG. 7, the crankcase 21 is formed integrally with a chain casing 81 which accommodates a chain 80 drivingly coupling the crankshaft, not shown, to the generator 70. The crankcase 21 is also formed integrally with a cylindrical generator casing 71 accommodating the generator 70 located at one side wall 81a of the chain casing 81, and a starting motor fitting frame 110 having a generally annular configuration and an idle gear casing 101, both located at the other side wall 81b of the chain casing 81, and arranged adjacent to and parallel with each other. Further integrally formed with the crankcase 21 at the side wall 81b of the generator casing 71 is an annular frame 75 which is arranged in concentricity with the generator casing 71. The frames 75 and 110 are formed, respectively, with through holes 75a and 110a axially extending along their axes, while the chain casing 81 has its wall 81b formed with a through hole 81c at a location concentric with the axes of the frames 75 and 110. These through holes 75a, 81c and 110a are concentrically located and have their diameters designed so as to satisfy the relationship of $75a \geq 81a \geq 110a$, as shown in FIG. 8. The cover 190 is mounted on the frame 110 in a manner facing the hole 81c of the side wall 81b and radially extends across the hole 110a.

The shaft 72 of the generator 70 has its half portion journalled by the bearing 124 arranged in a manner similar to the arrangement in FIG. 5 according to the first embodiment, and its other half portion in a through hole 81c formed in the side wall 81b of the chain casing 81 through a bearing 125, respectively. The arrangement of the sprocket 73, the rotor 76, the one-way clutch 130, the oil returning hole 72b, etc. all arranged on the shaft 72 is substantially identical with the embodiment in FIG. 5. Illustration of a pin corresponding to the pin 106 in FIG. 5 is omitted here.

The output shaft 92 of the starting motor 90 has an enlarged boss 92a fitted in the hole 110a in the motor fitting frame 110, with a sealing member 94 interposed between the boss 92a and the hole 110a. The starting motor 90 is fixed to the upper surface 21a of the crankcase 21, at its base 90b by means of a bolt 96. Thus, the output shaft 92 of the starting motor 90 and the drive shaft 72 of the generator 70 are arranged in concentricity with each other.

A swelled portion 140 radially outwardly extends from the junction between the side wall 81b of the chain casing 81 and the frame 110. The swelled portion 140 is formed therein with a tapped hole 140a in which a fluid coupling 141 similar to that of FIG. 5 is screwed. The coupling 141 operates in cooperation with the oil-tight chamber 145 defined between the cover 190 and the end of the shaft 72, the hole 72b formed in the shaft 72, and the holes 72c, 72d, 73a and 137a communicating with the hole 72b, in a manner similar to the arrangement in FIG. 5.

FIGS. 9 through 13 illustrate modifications of the generator 80 and the transmission case 12. In these figures, elements and parts corresponding to those appearing in FIGS. 3 through 8 are designated by identical reference numerals. According to these modifications, the generator 70 is provided with a forced-air cooling device, and a waterproofing cover.

Figure 9:
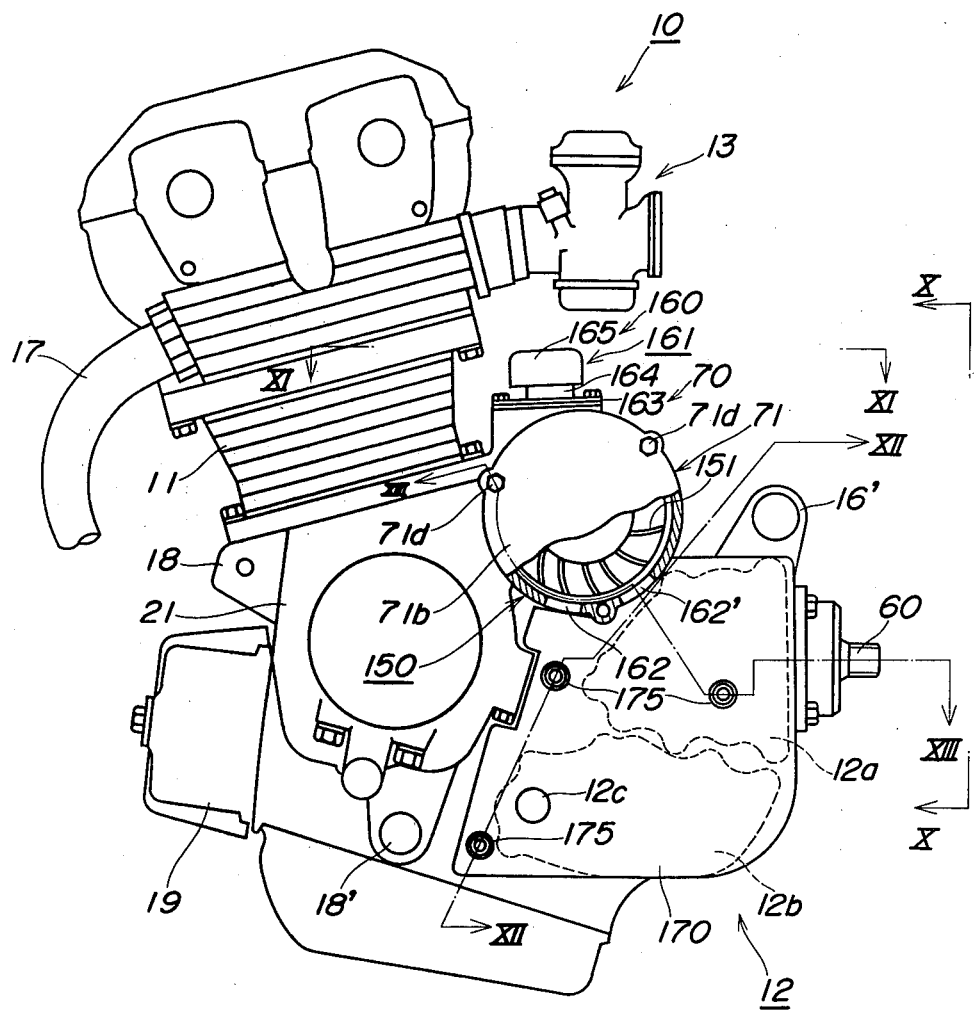
FIG. 9 is a side view, partly broken away, of an engine for motorcycles according to the present invention, particularly showing modifications of the generator and the transmission case.

As shown in FIG. 9, the forced-air cooling device comprises an air cooling means 150 and a port means 160 for effecting suction or discharge of air into or out of the generator 70. In the illustrated arrangement, an air intake port 161, which forms essential part of the port means 160 and is adapted to suck cooling air into the generator casing 71, is provided at an upper portion of the cylindrical casing 71 at a location rearward of the engine cylinders 11 and opposite a substantially transversely central portion of the latter. On the other hand, an air cooling fan 151 forming essential part of the air cooling means 150 is mounted in the casing 71, which forcedly sucks cooling air present at a zone right rearward of the engine cylinders 11, into the interior of the casing 71 through the above air intake port 161, when operated. Formed in the bottom of the peripheral wall of the casing 71 are two air outlet ports 162 and 162' for discharging the sucked air from the casing 71. The air discharged through the air outlet ports 162 and 162' is guided in a gap defined between gear boxes 12a and 12b arranged immediately below the generator 70 and forming part of the transmission case 12, and a cover 170 disposed over these gear boxes 12a and 12b, to be discharged to the outside. The carburetor 13 is mounted on the rear wall of the engine cylinders 11 at a location above the air intake port 161. In FIG. 9, reference numeral 17 designates an exhaust pipe, 18 and 18' engine fitting hangers, 19 an oil filter, 12c a change pedal shaft, and 175 a bolt, hereinafter referred to respectively.

Figure 10:
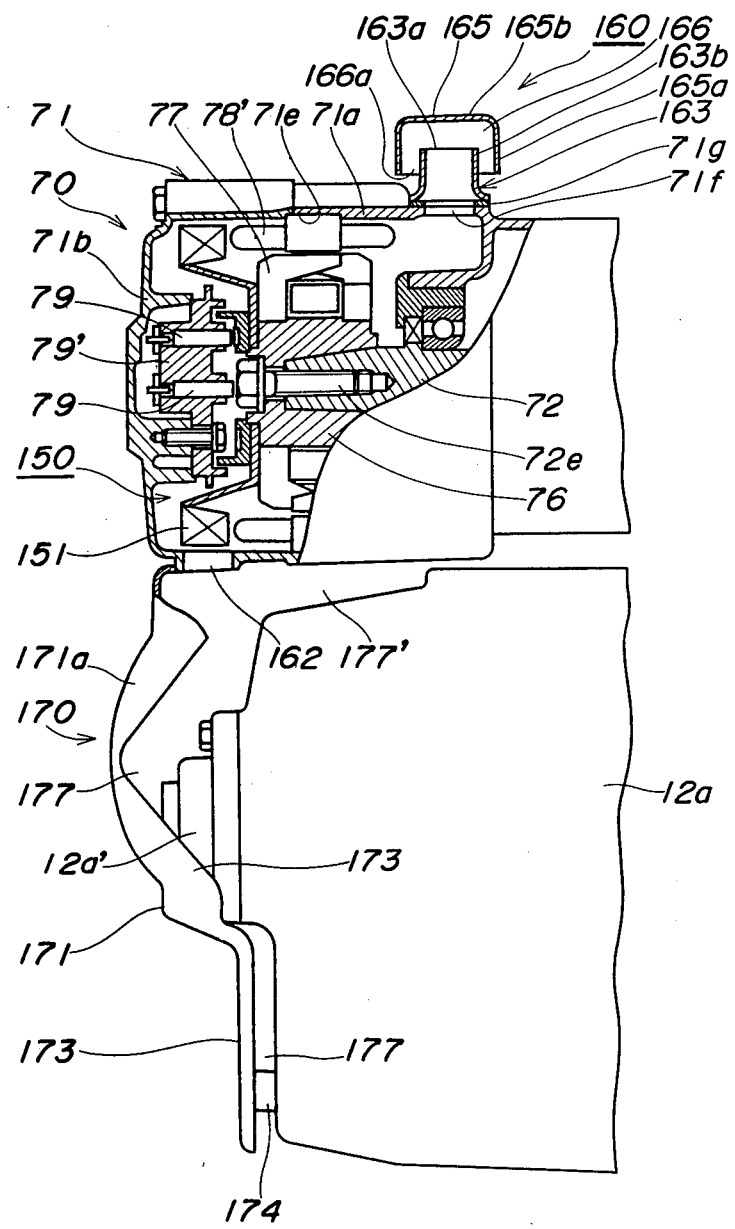
FIG. 10 is a fragmentary rear view, partly broken away, of the generator and the transmission case, as viewed in the direction of the arrows X—X in FIG. 9.
Figure 11:
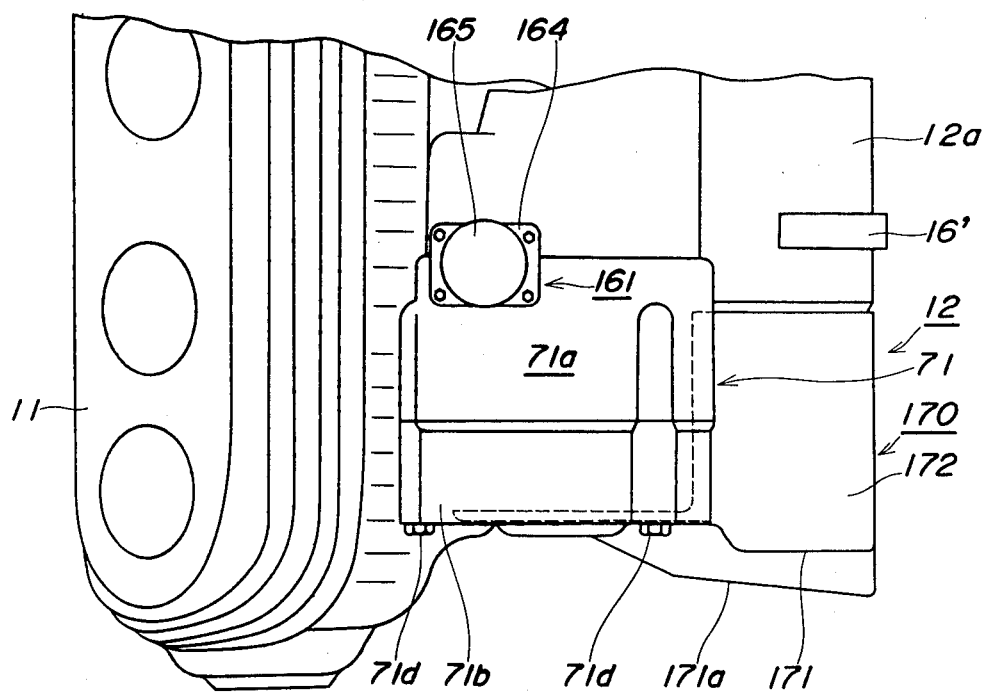
FIG. 11 is a fragmentary top plan view of the generator, as viewed in the direction of the arrows XI—XI in FIG. 9.

Referring to FIGS. 10 and 11, the drive shaft 72 of the generator 70 carries the rotor 76, the air cooling fan 151 secured to the rotor 76, and a rotor coil 77 fitted around the rotor 76, which are all mounted on the drive shaft 72 by means of the bolt 72e.

A pair of brushes 79 and 79 for picking up electric current generated in the rotor coil 77 are embedded in an insulator 79' which is made of a synthetic resin material or the like, and secured to an inner end face of the casing cap 71b by means of a bolt 79".

On the other hand, a through hole 71f is formed in the peripheral wall of the main body 71a of the casing at an uppermost portion, and the air intake port 161 is mounted on the peripheral wall of the main body 71a via a packing 71g, in alignment with the through hole 71f. This air intake port 161 comprises a hollow tubular member 163 upwardly projected from the peripheral wall of the main body 71a and formed integrally with a rectangular flange 164 secured on the same peripheral wall, and a cap 165 having an inverted U-shaped cross section. The cap 165 has a cylindrical peripheral wall 165a having an inner diameter larger than the outer diameter of the tubular member 163, and concentrically disposed over the latter by means of a support member, not shown, in such a manner that the end wall 165b is disposed in spaced and opposite relation to the upper open end 163a of the tubular member 163, and the skirt portion of the peripheral wall 165a to the peripheral wall 163b, respectively, defining an air intake passage 166 extending between the end wall 165b and the upper open end 163a of the tubular member 163, and also between the peripheral skirt portion 165a and the peripheral wall 163b of the tubular member 163. Thus, the air intake passage 166 communicates, on one hand, with the interior of the casing 71 through the interior of the hollow tubular member 163 and the through hole 71f, and, on the other hand, has a downwardly directed open end 166a communicating with the atmosphere, to introduce air into the casing 71a.

Figure 12:
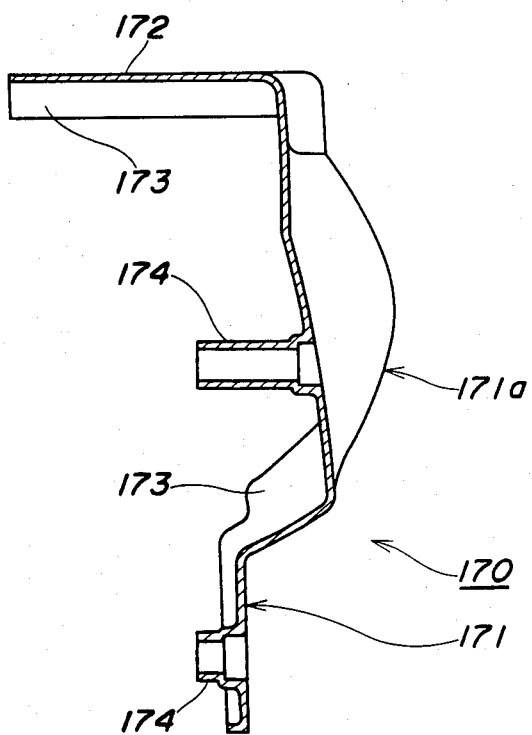
FIG. 12 is a sectional view taken along line XII—XII in FIG. 9 and showing a waterproofing cover.

The waterproofing cover 170 is mounted on a lower portion of the peripheral wall of the casing 71 of the generator 70 in a manner covering lateral side surfaces of the gear boxes 12a and 12b mounted at the rear wall of the crankcase 21 at a location immediately below the generator 70 and also covering part of the upper surface of the gear box 12a. This waterproofing cover 170 has a generally inverted L-shaped cross section as shown in FIG. 12 and is formed of a one-piece metal plate by thin plate working. It has a lateral side 171 having a shape substantially corresponding to a lower portion of the casing 71 of the generator 70, the rear wall of the crankcase 21 and the lateral side surfaces of the gear boxes 12a and 12b. The lateral side 171 has a laterally projected portion 171a which corresponds to a lateral projection 12a' (FIG. 10) formed on the gear box 12a. The waterproofing cover 170 has a generally flat ceiling surface 172 which has its left edge, as viewed in FIG. 11, downwardly bent along the lower portion of the generator casing 71 and held in close contact with the lower peripheral wall portion of the casing 71. A flange 173 extends transversely inwardly from a rear edge of the waterproofing cover 170, as shown in FIG. 12. The lateral side surface 171 of the cover 170 is provided with a plurality of inwardly projecting fitting bosses 174, at which the cover 170 is joined to the crankcase 21 and the gear box 12a by means of bolts 175 screwed in the lateral side surfaces of the crankcase 21 and the gear box 12a through the bosses 174.

Figure 13:
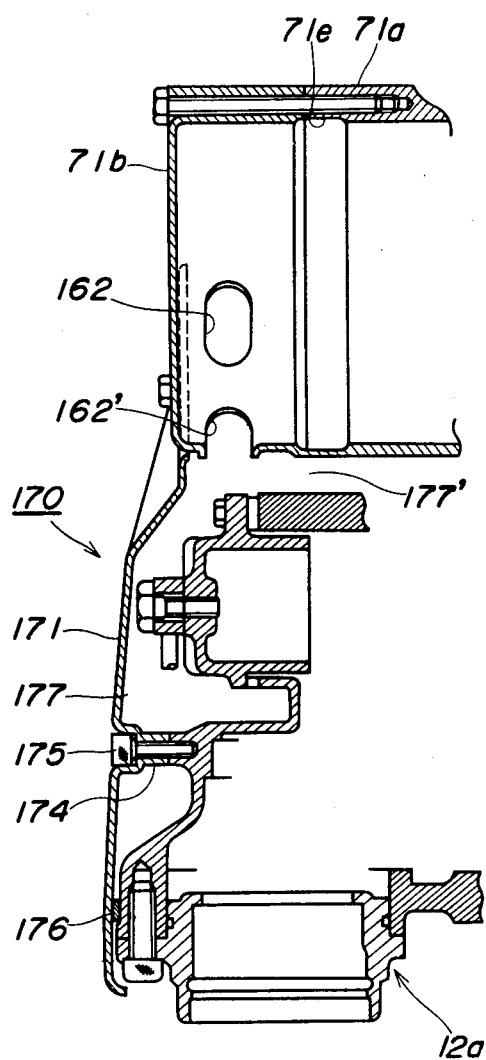
FIG. 13 is a fragmentary sectional view taken along line XIII—XIII in FIG. 9.

As shown in FIG. 13, a spacer 176 made of rubber is interposed between the lateral side surface of the gear box 12a and the lateral side surface 171 of the waterproofing cover 170 to keep them spaced from each other at a predetermined distance, defining continuous cooling air passages 177 and 177' extending, respectively, between the lateral side surfaces of the gear boxes 12a and 12b and the lateral side surface 171 of the cover 170 and between the upper surface of the gear box 12a and the upper surface 172 of the cover 170.

The operation of the forced-air cooling means of the generator is as follows: When the generator 70 is driven, electric current generated by rotation of the rotor coil 77 is picked up by the brushes 79 and 79. At the same time, the fan 151 rotates in unison with the rotor coil 77 to forcedly cause the cooling air inside the casing 71 to be discharged through the air outlet holes 162 and 162', while simultaneously fresh air is sucked into the casing 71 due to negative pressure produced in the casing 71, through the downwardly directed open end of the air intake passage 166, and then through the tubular member 163 and the through hole 71f. The cooling air thus introduced into the casing 71 circulates through the rotor coil 77, the stator coil 78', the brushes 79, etc. to cool them, then discharged through the air outlet holes 162 and 162' and guided through the gaps between the gear boxes 12a and 12b and the cover 170, to the outside.

Although in the illustrated arrangement, the port means 160 serves as an air intake port 161, it may be arranged to serve as a discharge port for cooling air.

Referring next to FIGS. 14 through 17, there is illustrated another modification of the generator 70. This modification is distinguished from the arrangement of FIGS. 9 through 13 in that the generator 70 is provided with a forced-air cooling means which has a partition member 180 arranged between the air cooling fan and the air passing openings formed in the casing 71, and the generator 70 comprises a brushless type.

Figure 14:
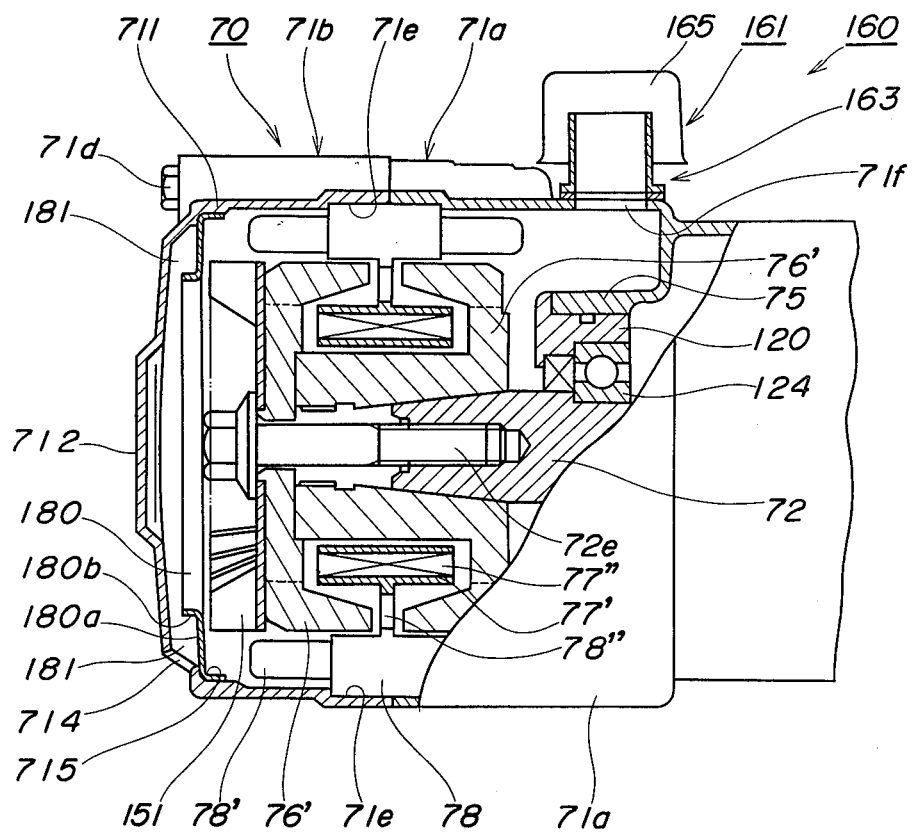
FIG. 14 is a fragmentary side view, partly broken away, of a modification of the generator.
Figure 15:
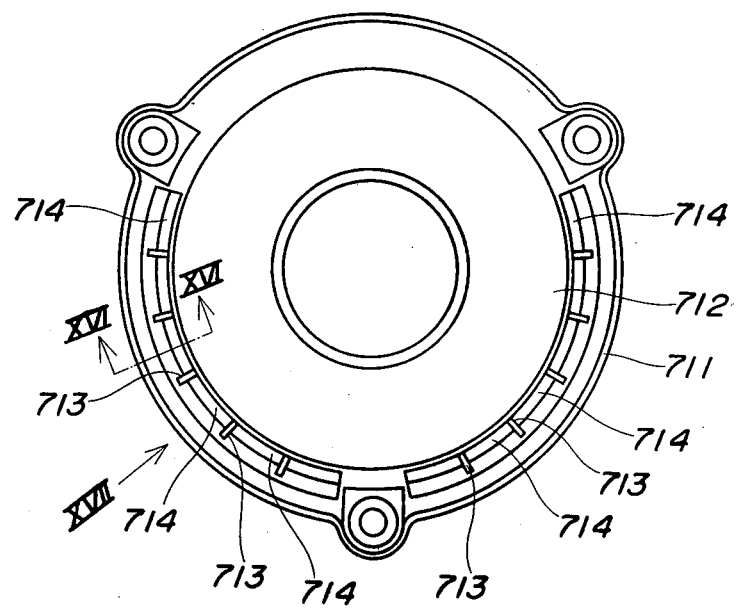
FIG. 15 is a fragmentary end view of the generator of FIG. 14, particularly showing a casing cap thereof.
Figure 16:
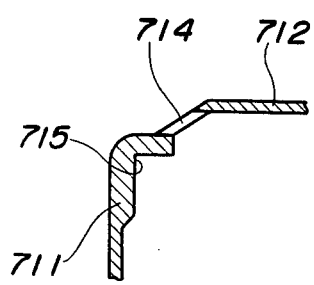
FIG. 16 is a fragmentary sectional view of part of the casing cap of FIG. 15 formed with openings, taken along line XVI—XVI in FIG. 15.
Figure 17:
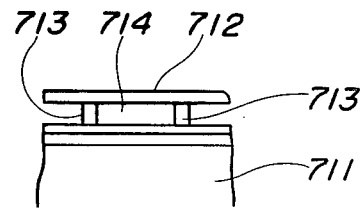
FIG. 17 is a fragmentary bottom plan view of part of the casing cap of FIG. 15, as viewed in the direction of the arrow XVII in FIG. 15.

In FIG. 14, a rotor 76' accommodates a core 77' having a field coil 77" wound thereon, which core is supported by the stator core 78 by means of ribs 78". In this modification, the port means 160 is used as an air discharge port 161'.

As shown in FIGS. 14 through 17, the casing cap 71b having a cap-like configuration is integrally formed of a cylindrical peripheral wall portion 711 and a bottom wall portion 712. A multiplicity of, e.g. twelve, openings 714 are formed in a lower half portion of the peripheral edge of the bottom wall portion 712 of the casing cap 71b, which are defined by many radially directed bars 713 formed integrally on the casing cap 71b at a location between the peripheral wall portion 711 and the bottom wall portion 712. The cylindrical portion 711 has its front end inner wall formed with an annular stepped shoulder 715, and the partition wall 180 in the form of an annulus is fitted in the stepped shoulder 715 and secured thereto, with its annular outer fringe portion 180a disposed opposite the above-mentioned openings 714. An annular ridge 180b is formed along the inner peripheral edge of the partition member 180, which is formed by axially bending the above inner peripheral edge toward the bottom wall portion 712 of the casing cap 71b or in the leftward direction as viewed in FIG. 14. An annular space 181 is defined between the annular outer fringe portion 180a and annular ridge 180b of the partition member 180 and the inner surface of the bottom wall portion 712 of the casing cap 71b.

The operation of the arrangement of FIGS. 14 through 17 is as follows: When the drive shaft 72 rotates to cause rotation of the rotor 76', and rotation of the fan 151 in unison therewith, the field core 77" is energized by small electric power supplied thereto through terminals, not shown, to form a rotating magnetic field around the rotor 76' and the resulting induced electromotive force generated by the stator coil 78' is picked up through further terminals, not shown. The rotating fan 151 causes cooling air to be forcedly sucked into the casing 71 through the openings 714 formed in the casing cap 71b. The sucked air is guided through the rotor 76', the stator coil 78', the field coil 77', etc. in the casing 71, to cool them, and then discharged to the outside through the air discharge port 161'.

The manner in which the cooling air is sucked into the casing 71 through the openings 714 is as follows: After being introduced into the casing 71 through the openings 714, the cooling air is evenly circumferentially distributed along the annular space 181. Therefore, the stator coil 78', the field coil 77', etc. in the casing 71 are evenly cooled, to enhance the cooling efficiency. Further, if rain water, sands, etc. are sucked together with air into the casing during running in rainy weather, for instance, the rain water or the sands collide against the annular partition member 180 disposed opposite the openings 714 due to their larger inertia than air, and are downwardly guided along the outer side wall surface of the partition member 180 facing the annular space 181. Then, they are discharged to the outside, through lowermost ones of the openings 714 of the casing cap 71b. Due to this separation of rain water or sands from the sucked air, the air sucked into the casing 71 is substantially free of such rain water or sands.

In place of the openings 714, a single large circular or elongate hole may be formed in the peripheral edge of the bottom wall portion 712 of the casing cap 71b. The air inlet arrangement described above may be also applied to other types of generator than the brushless type illustrated. Still further, the port means 160 may be used as an air intake port, and at the same time the openings 714 as air discharge openings, respectively, in a manner reverse to the illustrated arrangement. Even with such alternative arrangement, intrusion of washing water, mud, pebbles, etc. into the casing 71 can be prevented due to the unique construction of the port means 160 previously described.

The above described arrangements according to the invention provide many excellent results as below:

(1) The generator and the starting motor can be arranged in axially opposite relation to each other in a compact manner, due to the feature that the mainshaft is located at a level lower than the plane on which the crankshaft and the countershaft are located, providing a substantially flat surface portion on at least part of the upper surfaces of the crankcase and the transmission case. Also, an engine fitting hanger can be provided at such a location behind the engine cylinders, as is appropriate for the main frame to maintain its required rigidity, without interfering with the starting motor. Further, the axially opposite arrangement of the generator and the starting motor can bring about a good weight balance between the left and right sides of the engine, as shown in the following table:

| Left Side | Weight (Kg) | Right Side | Weight (Kg) |
| --- | --- | --- | --- |
| Generator: | 2.5 | Clutch: | 2.1 |
| Final Bevel Gear: | 1.3 | Primary Reduction Driven Gear: | 1.4 |
| Change Gear: | 0.6 | Starting Motor: | 1.5 |
| Clutch Lifter: | 0.4 | Total: | 5.0 |
| Total: | 4.8 | | |

Further, if the distance between the mainshaft and the countershaft is set at the same value as the conventional engine, the axial size l' of the engine according to the present invention can be reduced to a smaller value than the conventional size l, as shown in FIG. 1 and FIG. 3. As a consequence, the rear axle pivot can be located at a more forward location, and also, the length of the rear forks can be increased, while simultaneously the gravitational center of the motorcycle body can be located at a more forward location, resulting in improved riding comfortableness of the motorcycle;

(2) The axially opposite arrangement of the generator and the starting motor enables integral formation of the generator casing, the motor fitting frame, the crankcase and other casings in one body to reduce the number of component parts, as well as the weight. This permits fabrication of the casings and the frame under the same process, resulting in enhanced productivity as well as in reduced production cost;

(3) The provision of a cooling air port assembly having a downwardly directed open end on the upper wall of the generator enhances the waterproofness of the generator. Further, the arrangement of the same port assembly at a central location behind the engine cylinders promotes the flow of air in the vicinity of the port assembly, resulting in improved air cooling efficiency;

(4) The provision of the waterproofing cover at a location immediately below the generator casing further enhances the waterproofness of the generator.

Obviously many modifications and variations of the present invention are possible in the light of the above disclosure. It is therefore to be understood that within the scope of the appended claims the invention may practiced otherwise than as specifically described.

What is claimed is:

1. An engine for a motorcycle, comprising:
a crankshaft extending transversely of said motorcycle;
a crankcase accommodating said crankshaft and having an upper surface;
a mainshaft arranged to be rotatively driven by said crankshaft;
a clutch interposed between said crankshaft and said mainshaft, for selectively allowing transmission of power from the former to the latter and interrupting same;
a countershaft engaging with said mainshaft;
a transmission case structure accommodating said mainshaft, said countershaft, and said clutch and having an upper surface upon which one or more accessories may be arranged;
said mainshaft being located at a level lower than said crankshaft and said countershaft;
a generator arranged on said upper surfaces of said crankcase and transmission case structure, said generator having a drive shaft disposed parallel with said crankshaft;
a starting motor arranged on said upper surfaces of said crankcase and said transmission case structure, said starting motor having an output shaft disposed parallel with said crankshaft, said output shaft having one end disposed adjacent one end of said drive shaft of said generator;
said drive shaft of said generator and said output shaft of said starting motor extending from said one ends thereof in opposite directions away from each other;
first power transmitting means drivingly coupling said generator and said starting motor; and
second power transmitting means drivingly coupling said generator and said crankshaft.

2. The engine for a motorcycle as claimed in claim 1, wherein said drive shaft of said generator and said output shaft of said starting motor are located on different axes to each other.

3. The engine for a motorcycle as claimed in claim 1, wherein said drive shaft of said generator and said output shaft of said starting motor are located on the same axis.

4. The engine for a motorcycle as claimed in claim 3, including a generator casing having an end portion facing said starting motor, said end portion being formed with a first hole in which said one end of said drive shaft of said generator is journalled, and a frame provided at said one end portion of said generator casing and formed with a second hole in which said one end of said output shaft of said starting motor is journalled, and wherein said first hole and said second hole are disposed concentrically and opposite each other.

5. The engine for a motorcycle as claimed in claim 4, wherein said generator casing and said frame are integrally formed in one body with at least part of said crankcase and said transmission case structure.

6. The engine for a motorcycle as claimed in claim 1, including a pair of hangers for fitting said engine to a main frame of said motorcycle, and wherein one of said hangers is arranged at one side of said engine at a location close to said generator.

7. The engine for a motorcycle as claimed in claim 1, including a gear secured on said drive shaft of said generator, and wherein said first power transmitting means comprises an idle gear engaging with said gear, and a one-way clutch interposed between said idle gear and said output shaft of said starting motor and engaging therewith.

8. The engine for a motorcycle as claimed in claim 1, wherein said second power transmitting means comprises a first sprocket secured on said drive shaft of said generator, a second sprocket secured on said output shaft of said starting motor, and a chain engaging with said first and second sprockets.

9. The engine for a motorcycle as claimed in claim 1, wherein said generator comprises; a casing having a peripheral wall; a forced-air cooling fan arranged within said generator casing; and port means provided at said peripheral wall of said generator casing, for suction or discharge of air into or out of said casing, said port means having a through hole formed in said peripheral wall of said generator casing, a hollow tubular member arranged on said peripheral wall of said generator casing in alignment with said through hole and projected upwardly of said generator casing, said hollow tubular member having an upper open end and a peripheral wall, and a cap disposed over said upper open end of said hollow tubular member and at least part of said peripheral wall of same, said hollow tubular member and said cap defining therebetween an air passageway which has a downwardly directed annular open end and communicates the atmosphere with said upper open end of said hollow tubular member.

10. The engine for a motorcycle as claimed in claim 9, including at least one engine cylinder, and wherein said generator casing is located rearwardly of said engine cylinder, and said port means is located rearwardly of said engine cylinder and opposite a substantially transversely central portion thereof, whereby said forced-air cooling fan and said port means cooperate to suck air present at a zone rearward of said engine cylinder into said generator casing.

11. The engine for a motorcycle as claimed in claim 9 or 10, wherein said generator casing has one end face remote from said starting motor, and at least one second through hole formed in a lower portion of said peripheral wall thereof at a location in the vicinity of said one end face thereof, said second through hole communicating with said port means through the interior of said generator casing, whereby said second through hole cooperates with said forced-air cooling fan to suck or discharge air into or out of said generator casing.

12. The engine for a motorcycle as claimed in claim 10, including a waterproofing cover disposed over part of said transmission case, said waterproofing cover being downwardly pendent from a lower portion of said peripheral wall of said generator casing and extending along said transmission case structure, in a manner defining a second air passageway between said waterproofing cover and said transmission case structure, said second air passageway communicating said through hole formed in said peripheral wall of said generator casing with the atmosphere.

13. The engine for a motorcycle as claimed in any one of claims 1, 2, 3, 4, 5, 6, 7 or 8, including at least one engine cylinder and a waterproofing cover disposed over part of said transmission case, said generator being located rearwardly of said engine cylinder, said generator including a casing having a peripheral wall, and a forced-air cooling fan arranged within said generator casing, said generator casing having at least one through hole formed in a lower portion of said peripheral wall thereof, for suction or discharge of air into or out of said generator casing in cooperation with said forced-air cooling fan, said transmission case structure being located immediately below said generator casing, said waterproofing cover being downwardly pendent from said lower portion of said peripheral wall of said generator casing and extending along said transmission case structure, in a manner defining a second air passageway between said waterproofing cover and said transmission case structure, said second air passageway communicating said last-mentioned through hole with the atmosphere.

14. The engine for a motorcycle as claimed in claim 1, wherein said transmission case structure is composed of a mainshaft casing accommodating said mainshaft, a clutch casing accommodating said clutch, and a countershaft casing accommodating said countershaft, said crankcase, said mainshaft casing, and said clutch casing having a continuous and substantially flat surface forming at least part of upper surfaces thereof, said generator being arranged on the upper surfaces of said mainshaft casing and said crankcase, said starting motor being disposed on the upper surfaces of said mainshaft casing and said clutch casing.

* * * * *